US009118508B2

(12) United States Patent
Bouthemy

(10) Patent No.: US 9,118,508 B2
(45) Date of Patent: Aug. 25, 2015

(54) SERVICE EXECUTION ACROSS LEGACY AND INTERNET PROTOCOL MULTIMEDIA SUBSYSTEM DOMAINS

(75) Inventor: Jean-Luc R. Bouthemy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 830 days.

(21) Appl. No.: 12/843,529

(22) Filed: Jul. 26, 2010

(65) Prior Publication Data

US 2012/0020252 A1 Jan. 26, 2012

(51) Int. Cl.
*H04L 12/66* (2006.01)
*H04W 88/16* (2009.01)

(52) U.S. Cl.
CPC ............... *H04L 12/66* (2013.01); *H04W 88/16* (2013.01)

(58) Field of Classification Search
CPC ............................... H04W 88/16; H04L 12/66
USPC ................... 370/259, 261, 352, 401
See application file for complete search history.

(56) References Cited

U.S. PATENT DOCUMENTS

| 7,898,990 B2* | 3/2011 | Kallio et al. ............... 370/261 |
| 7,917,396 B1* | 3/2011 | Drake et al. ............... 725/106 |
| 2012/0134351 A1* | 5/2012 | Ewert et al. ............... 370/338 |

* cited by examiner

*Primary Examiner* — Man Phan
*Assistant Examiner* — Kevin Lee
(74) *Attorney, Agent, or Firm* — Lee & Hayes, PLLC

(57) ABSTRACT

Systems and methods for service execution across legacy telecommunications networks and Internet Protocol Multimedia Subsystem (IMS) domains are described. In one aspect, a convergence gateway is deployed in an IMS network to interface between the IMS network and a legacy circuit-switched (CS) telephony network (legacy network). The convergence server extends legacy network-supported circuit-switched services (including voice supplementary services, enhanced voice services, and messaging) to IMS core network subscribers. To this end, the systems and methods rely on the legacy network to implement supported circuit-switched services and generate corresponding results. The corresponding results are adapted to a signaling protocol and state model for the IMS network and provided to one or more IMS subscribers.

19 Claims, 10 Drawing Sheets

Instant Messaging is supported in the legacy domain as SMS.

Instant Messaging is supported in the legacy domain as SMS.

SERVICE EXECUTION ACROSS LEGACY AND INTERNET PROTOCOL MULTIMEDIA SUBSYSTEM DOMAINS

BACKGROUND

Internet Protocol (IP) Multimedia Subsystem is a standardized set of specifications that describes a Next Generation Network (NGN) with a generic architecture for Internet Protocol (IP)-based telephony and multimedia services. Third Generation Partnership Project (3GPP) and Third Generation Partnership Project 2 (3GPP2) enable and support the evolution of mobile networks beyond second-generation (2G) mobile systems such as Global System for Mobile Communications (GSM) and cdma2000. IP Multimedia Subsystem (IMS) was also adopted by other standardization bodies (e.g., Wi-MAX and TISPAN) for their future networks. IMS uses Session Initiation Protocol (SIP) to control multimedia communication sessions such as video and Voice calls over IP (VoIP), Instant Messaging, and presence. Some of the benefits of IMS core networks include, for example, support for VoIP and multimedia services based on standardized interfaces and reusable components, network optimization, policy control, and charging. Telecommunication Service Providers (TSPs) are investing in and deploying IMS/IP core networks to provide these benefits to their subscribers.

According to the approach defined in 3GPP specifications, all services are anchored in the IMS domain as defined in Single Radio Voice Call Continuity (SR-VCC) 3GPP work item (for more information, please refer to 3GPP TS 23.216, 3GPP TS 24.206, 3GPP TS 24.216, and 3GPP TS 24.237). However, TSPs with a legacy mobile network typically want to leverage past investments in already deployed legacy network circuit-switched services. Such services include, for example, basic voice and supplementary services, voicemail, directory services, Intelligent Network (IN)-based services (e.g., prepaid, local number portability, caller tune), regulatory features (e.g., Lawful intercept, e911), Short Message Service (SMS), Multimedia Messaging Service (MMS), Unstructured Supplementary Service Data (USSD), and so on. However, IMS core network subscribers do not generally have voice service parity with legacy networks without deploying Telephony Application Servers (a/k/a MMTel servers) in the IMS domain. One reason for this is that the stable and customized natures of voice-related services in legacy domains generally limit the ease with which such services can be migrated to SIP-based application servers.

3GPP and 3GPP2 networks predominantly deliver legacy advanced services (e.g., LNP, CNAM, pre-paid, caller tune) via Service Control Points (SCP) connected via Intelligent Network (IN) using protocols such as Customized Application for Mobile Network Enhanced Logic (CAMEL) (if in 3GPP networks). Although the 3GPP specification proposes use of an IMS Service-Switching Function (IM-SSF) as an adaptation entity between IMS and the SCP to provide legacy supplementary services and other service features including Value-Added Services (VAS) to IMS subscribers, the proposed implementation is substantially limited. For example, because the signaling protocols between IMS (SIP) and the SCP (CAMEL application part (CAP)) are substantially different in terms of signaling messages and state model, complex mapping and state model implementations in the IM-SSF generally are needed for each supported legacy service. Moreover, since only a subset of CAP is utilized for communications between the SCP and the IM-SSF, many CAP to SIP conversions are typically restricted in scope. As a result, much of the legacy service features in the legacy environment is not available to IMS core network subscribers through the IM-SSF.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Overview

Systems and methods for service execution across legacy and IMS domains are described below in reference to FIGS. 1 through 10. The systems and methods provide legacy network voice service parity to IMS core network subscribers. To this end, a convergence gateway is deployed in the IMS core network to interface between the IMS network and a legacy CS network, including analog networks as well as digital networks such as 2G, 2.5G, and 3G networks (examples include GSM, ANSI IS-41, EDGE, UMTS, and LTE). The convergence gateway relies on the legacy mobile network to implement legacy circuit-switched services (e.g., basic voice service including regulatory features such as E911 and CALEA, supplementary services, regulatory voice features such as CALEA and E911, and value-added services such as caller tune) and adapt the results of those services to IMS subscribers. Moreover, the systems and methods use the convergence gateway to extend IMS core network-services to the legacy subscriber base. As such, the systems and methods: (1) extend IMS core network services to CS legacy domains; and (2) enable ubiquitous mobile services in an IMS network with 2G/3G supplementary and enhanced voice services delivered to any mobile or IP-based device. In these contexts, domain supported services remain available within a domain to subscribers.

By extending IMS core network services to legacy CS domains, the systems and methods allow legacy network subscribers to use their existing mobile core network Mobile Switching Center (MSC) to obtain IMS core network services such as VoIP-based services, IM, etc. Using the systems and methods, mobile operators can offer their subscribers new VoIP-based digital phone services without having to implement an IP core network. Additionally, by enabling legacy domain mobile services in the IMS environment, the systems and methods enable mobile services in the IMS world with legacy supplementary and enhanced voice services delivered to any mobile or IP-based device.

These and other aspects of the systems and methods are now described in greater detail.

An Exemplary System

Figure 1:
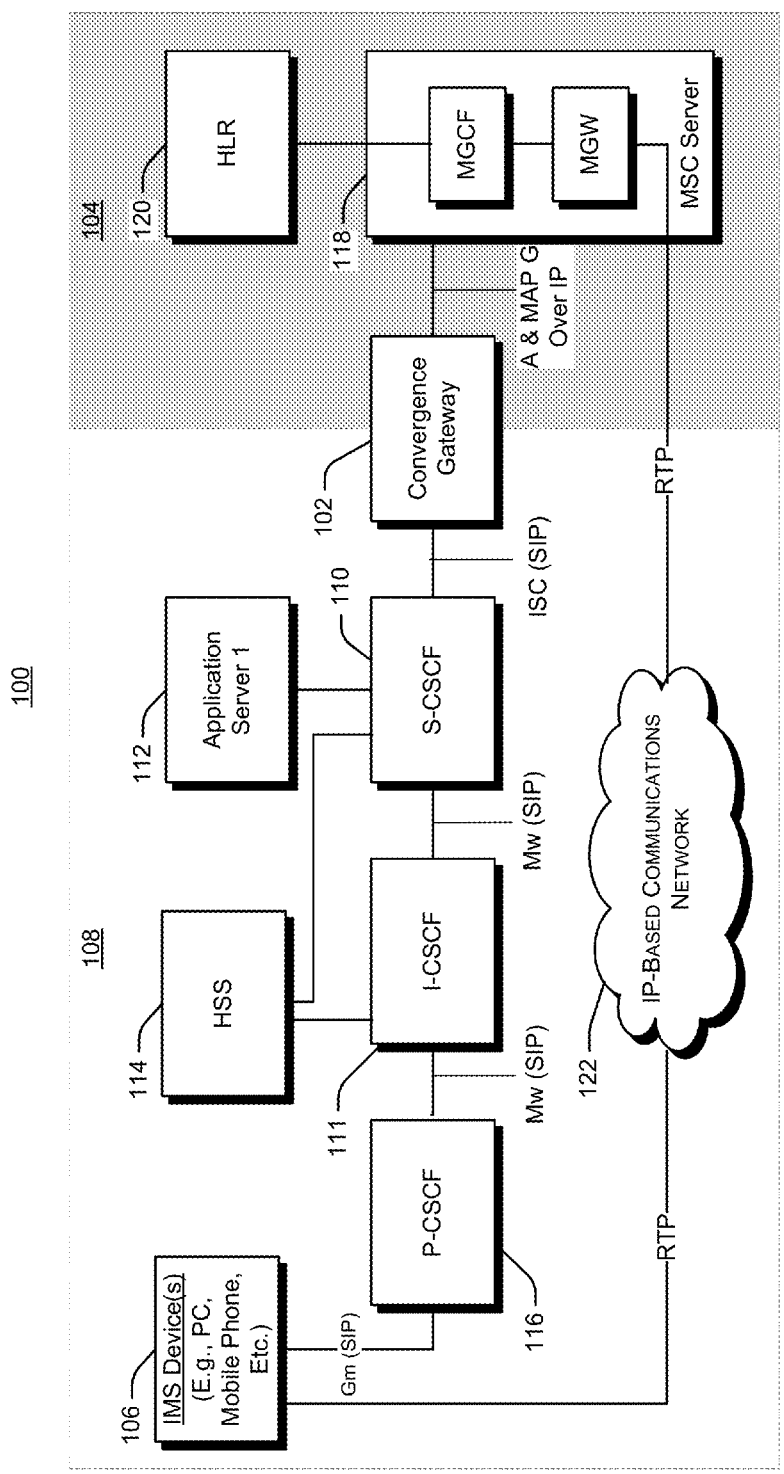
FIG. 1 illustrates an example system environment capable of implementing the systems and methods described herein for service execution across legacy and IMS domains, according to one embodiment.

FIG. 1 illustrates an example system environment 100 capable of implementing the systems and methods described herein for service execution across legacy and IMS domains, according to one embodiment. As illustrated, system 100 includes convergence gateway 102 (hereinafter also referred to as a "telecommunications network gateway") to provide legacy mobile voice services (e.g., basic voice and supplementary services, voicemail, IN-based services, SMS, MMS, USSD, etc.) from legacy CS network(s) 104 to subscribers using IMS devices 106 operatively coupled to IMS core network 108. Convergence gateway 102 further extends IMS core network services to subscribers of CS legacy domains. Because convergence gateway 102 is an interface between the packet-switched and circuit-switched domains, the convergence gateway is shown as an adaptation component between IMS domain 108 and circuit-switched domain 104. Convergence gateway 102 is implemented in the IMS domain 108.

As shown in FIG. 1, convergence gateway 102 is operatively coupled to a Serving Call Session Control Function (S-CSCF) 110, over the IMS Service Control (ISC) reference point. The S-CSCF 110 is a SIP server that handles SIP registrations, performs session control, and provides routing services, e.g., using Electronic Numbering (ENUM) lookups to forward SIP messages to appropriate Application Servers (e.g., convergence gateway 102 or AS 112) or other nodes such as P-CSCF or S-CSCF to continue the session in the IMS domain or Breakout Gateway Control Function (BGCF) to breakout in the CS domain. S-CSCF 110 also interfaces with the Home Subscriber Server (HSS) 114 to download user profiles. The S-CSCF 110 interacts with the Interrogating Call Session Control Function (I-SCSF) over the Mw reference point. I-CSCF 111 is a gateway to external networks, among other operations, provides the name of the next hop (either an application server or S-CSCF), and routes incoming requests to an assigned S-CSCF or application server depending on the information retrieved from the HSS 114.

S-CSCF 110 and I-CSCF 111 are operatively coupled to IMS Devices 106 via Proxy CSCF 116 (P-CSCF). IMS devices 106 include, for example, SIP-enabled devices such as mobile handsets/phones, personal computers, etc. The P-CSCF is a first point of contact for IMS devices. It ensures secure communications between IMS devices and IMS (e.g., by establishing and maintaining IPSec security association and applying integrity and confidentiality for SIP signaling), compression/decompression (SIP compression), interaction with services, and emergency session detection.

Convergence gateway 102 is operatively coupled to Mobile Switch Center (MSC) server 118 (Media Gateway Control Function (MGCF)) located in the circuit-switched domain 104. MSC server 118 provides circuit-switched calling, mobility management, and GSM services to the mobile phones roaming within the area that it serves. The MSC is the primary service delivery node for GSM, responsible for setting up and releasing end-to-end connections, routing voice calls and SMS as well as other circuit-switched services. MSC server 118 includes a Media Gateway (MGW) to interface with the media plane of the CS network 104, by converting between Real-Time Protocol (RTP) from IP-based telephony network 122 and Pulse Code Modulation (PCM) utilized in the legacy network 104.

In one implementation, e.g., when the legacy domain 104 is a 2G network, the MSC server 118 and a Visitor Location Register (VLR) for a Home Location Register (HLR) 120 perceive the convergence gateway 102 as a Base Station Controller (BSC). In another implementation, e.g., when the legacy domain is a 3G network, the MSC server 118 interfaces with the convergence gateway 102 as a Radio Network Controller (RNC). In other implementations, the convergence server adapts the signaling protocols and state models as appropriate to provide seamless service execution communications across the IMS and legacy domains. In the IMS model, S-CSCF 110 perceives the convergence gateway 102 as an Application Server. In this scenario, the convergence gateway translates SIP messages into the A interface. It does not act as a Telephony Application Server.

Exemplary Signaling Protocols

In this exemplary implementation, convergence gateway 102 interfaces in the IMS domain 108 using appropriate signaling protocol means for the communications and service(s) being provided, for example:

ISC (IMS Service Control) reference point: SIP protocol (interface between the convergence gateway 102 as an Application Server 112 and S-CSCF 110);

Sh reference point: Diameter (Interface between the convergence gateway 102 as an Application Server and HSS 114;

Mn reference point: H.248 protocol (interface between the convergence gateway 102 and the Media Gateway (MGW) portion of the MSC server 118. Other protocols may be used instead of H.248, for example, MSML or MEGACO.

In this exemplary implementation, convergence gateway 102 interfaces with the legacy domain (2G/2G.5 such as GSM or EDGE), for example, using the following:

BSSAP (BSS application Part) interface: same interface as between Base Station Controller (BSC) (here the convergence gateway 102) and MSC server (MGCF) 118. In this particular implementation, only Direct Transfer Application Part (DTAP) is used for call setup and teardown. In one implementation, the interface between the convergence gateway is either the A interface or the A over IP interface.

Mobile Application Part (MAP) interface D (MAP/D): same interface as between MSC (here convergence gateway 102 for location updates) and HLR 120.

Note: If the convergence gateway bridges between IMS and 3G CS networks, the convergence gateway interfaces with the Iu-CS interface, for example, instead of the A interface. In this scenario, for example, the convergence gateway supports the RANAP instead of the BSSAP for the transport of Non-Access Stratum (NAS) information for mobility management signaling.

Although a particular number of components are shown in the system 100 of FIG. 1, alternate embodiments may include any number of computing devices and data storage systems coupled via any number of data communication networks and/or communication links. For example, some of the functions described in FIG. 1 may be collocated. In other embodiments, convergence gateway 102 is replaced with any other type of computing device or replaced with a group of computing devices.

An Exemplary Convergence Gateway

Figure 2:
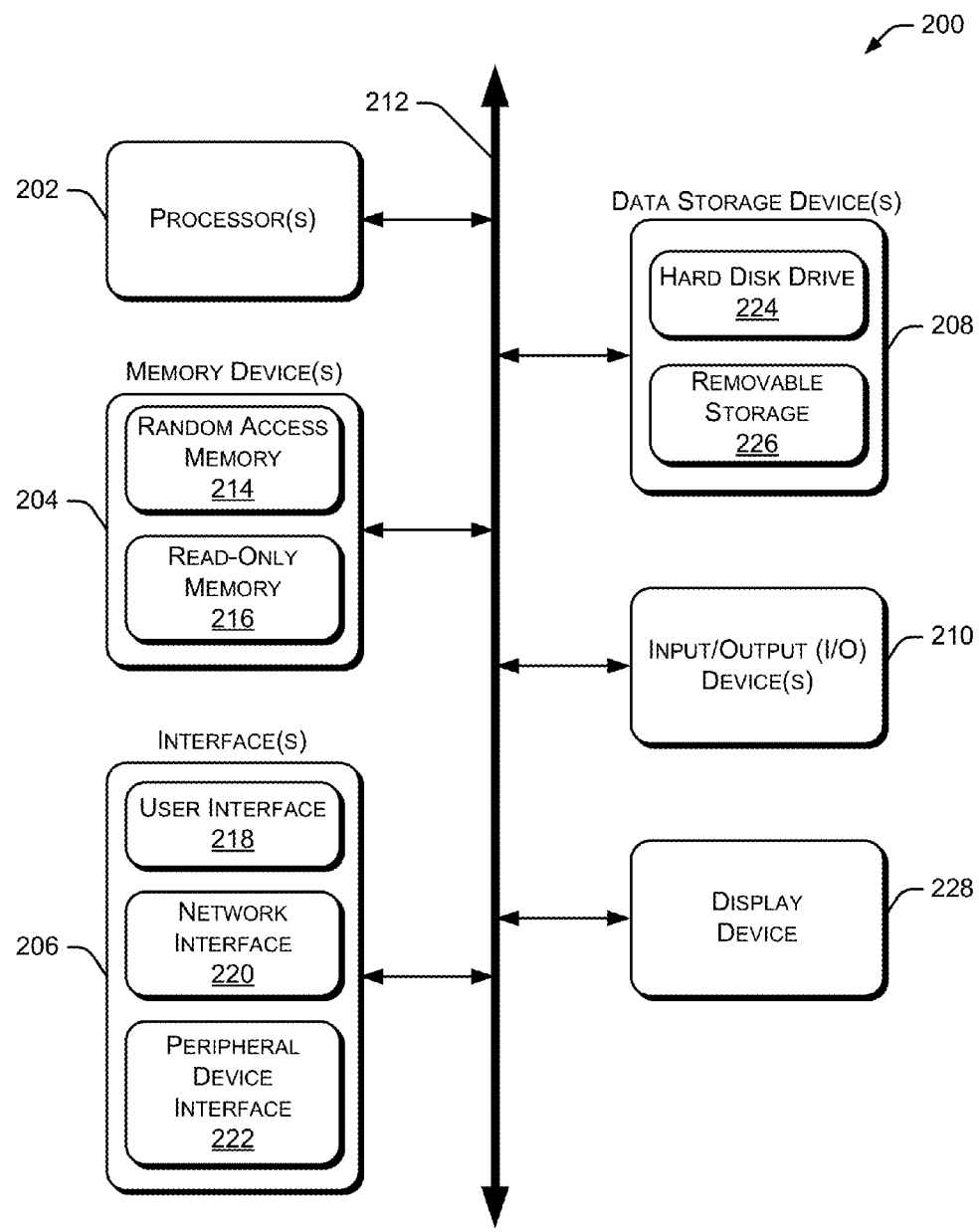
FIG. 2 shows an exemplary convergence gateway for service execution across legacy and IMS domains, according to one embodiment.

FIG. 2 shows an exemplary convergence gateway 102 for service execution across legacy and IMS domains, according to one embodiment. Convergence gateway 102 is a computing device used to perform various procedures, such as those discussed herein. Convergence gateway 102 can function as a server, a client, a worker node, or any other computing entity.

Convergence gateway 102 includes, for example, one or more processor(s) 202, one or more memory device(s) 204, one or more interface(s) 206, one or more data storage device(s) 208, and one or more I/O devices 210, all of which are coupled to a bus 212. Processor(s) 202 include one or more processors or controllers that execute computer program instructions stored in memory device(s) 204 and/or mass storage device(s) 208. The computer program instructions, when executed by processor(s) 202, implement operations for one or more of the exemplary procedures described herein. Processor(s) 202 may also include various types of computer-readable media, such as cache memory. Memory device(s) 204 include various computer-readable media, such as volatile memory (e.g., random access memory (RAM)) 214 and/or nonvolatile memory (e.g., read-only memory (ROM)) 216. Memory device(s) 204 may also include rewritable ROM, such as Flash memory.

Data storage device(s) 208 include various computer readable media, such as magnetic tapes, magnetic disks, optical disks, solid state memory (e.g., Flash memory), and so forth. As shown in FIG. 2, a particular data storage device is a hard disk drive 224. Various drives may also be included in data storage device(s) 208 to enable reading from and/or writing to the various computer readable media. Data storage device(s) 208 include removable media 226 and/or non-removable media. I/O device(s) 210 include various devices that allow data and/or other information to be input to or retrieved from computing device 200. In one implementation, example I/O device(s) 210 include cursor control devices, keyboards, keypads, microphones, monitors or other display devices, speakers, printers, network interface cards, modems, lenses, CCDs or other image capture devices, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interfaces include user interface 218 and peripheral device interface 222.

Bus 212 allows processor(s) 202, memory device(s) 204, interface(s) 206, data storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 102 and are executed by processor(s) 202. Alternatively, the systems and procedures described herein can be implemented in hardware, or a combination of hardware, software, and/or firmware. For example, one or more application-specific integrated circuits (ASICs) can be programmed to carry out one or more of the systems and procedures described herein.

Exemplary Procedures

Figure 3:
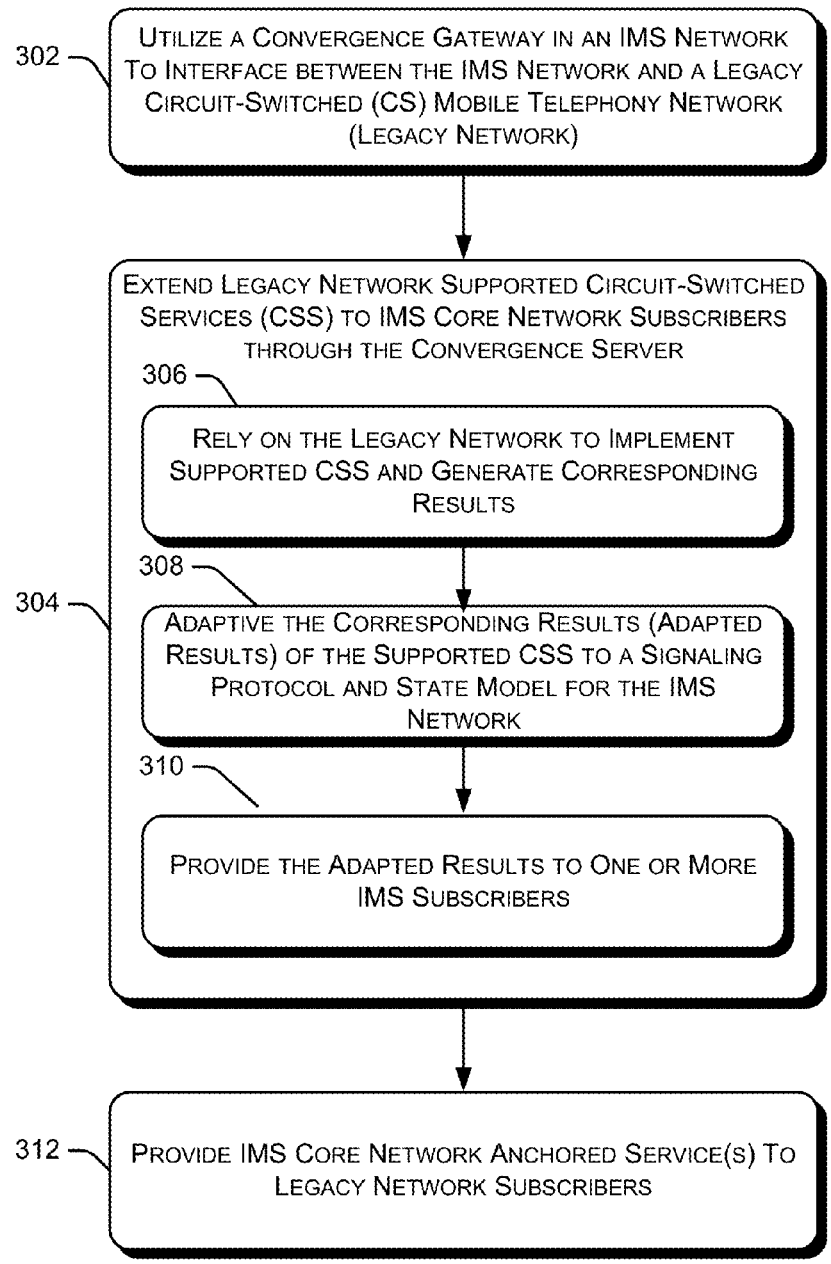
FIG. 3 illustrates an exemplary procedure for service execution across legacy and IMS domains, according to one embodiment.

FIG. 3 illustrates an exemplary procedure 300 for service execution in and across legacy and IMS domains, according to one embodiment. As described below, the following procedure extends legacy network supported service(s) to IMS core network subscribers by enabling ubiquitous mobile services in the IMS network with circuit-switched services (including basic and enhanced voice services as well as supplementary services) delivered to any mobile or IP-based device. Moreover, in one aspect, the procedure also provides IP-based services anchored in the IMS core network (108) to the legacy network (104).

More particularly, at block 302, procedure 300 utilizes/employs a convergence gateway (102) in an IMS network (106). The convergence gateway is operatively configured to interface between the IMS network and a legacy circuit-switched (CS) mobile telephony network (legacy network), for example, using SIP and non-SIP signaling protocols. At block 304, legacy network supported circuit-switched service(s) are extended to IMS core network subscribers through the convergence server. The convergence server is perceived as an application server (AS) to a Serving Call Session Control Function (S-CSCF) in the IMS network. In one implementation, if the legacy network (104) is a 2G network, the convergence server functions as a BSC to an MSC server (118). In another implementation, if the legacy network is a 3G network, the convergence server behaves as an RNC to the MSC server.

Operations of block 304 include, for example, steps of blocks 306, 308, and 310. For instance, at block 306, the procedure relies on the legacy network to implement supported circuit-switched services and generate corresponding results. In this implementation, the supported circuit-switched services are anchored in the legacy domain. In one implementation, the circuit-switched service(s) are Intelligent Network service(s) (e.g., caller tune, Local Number Portability, or prepay), messaging service(s), voicemail, and/or directory services. At block 308, the procedure adapts the corresponding results to produce adapted results for the supported legacy circuit-switched services, wherein the adapted results are converted to a signaling protocol (and any necessary state model) for the IMS network. At block 310, the procedure provides the adapted results to one or more IMS subscribers (users)) of IMS device(s) 106.

At block 312, and responsive to a request from a subscriber device in the legacy network (104), procedure 300 provides IMS core network service(s) such as IP-based voice services (e.g., VoIP) to the requesting subscriber device. As described above, these IP-based services are provided by the convergence server (102) performing as an application server in the core network (108) and as either a BSC or an RNC with respect to the MSC server (118), as a function of the type of legacy network (104).

Figure 4:
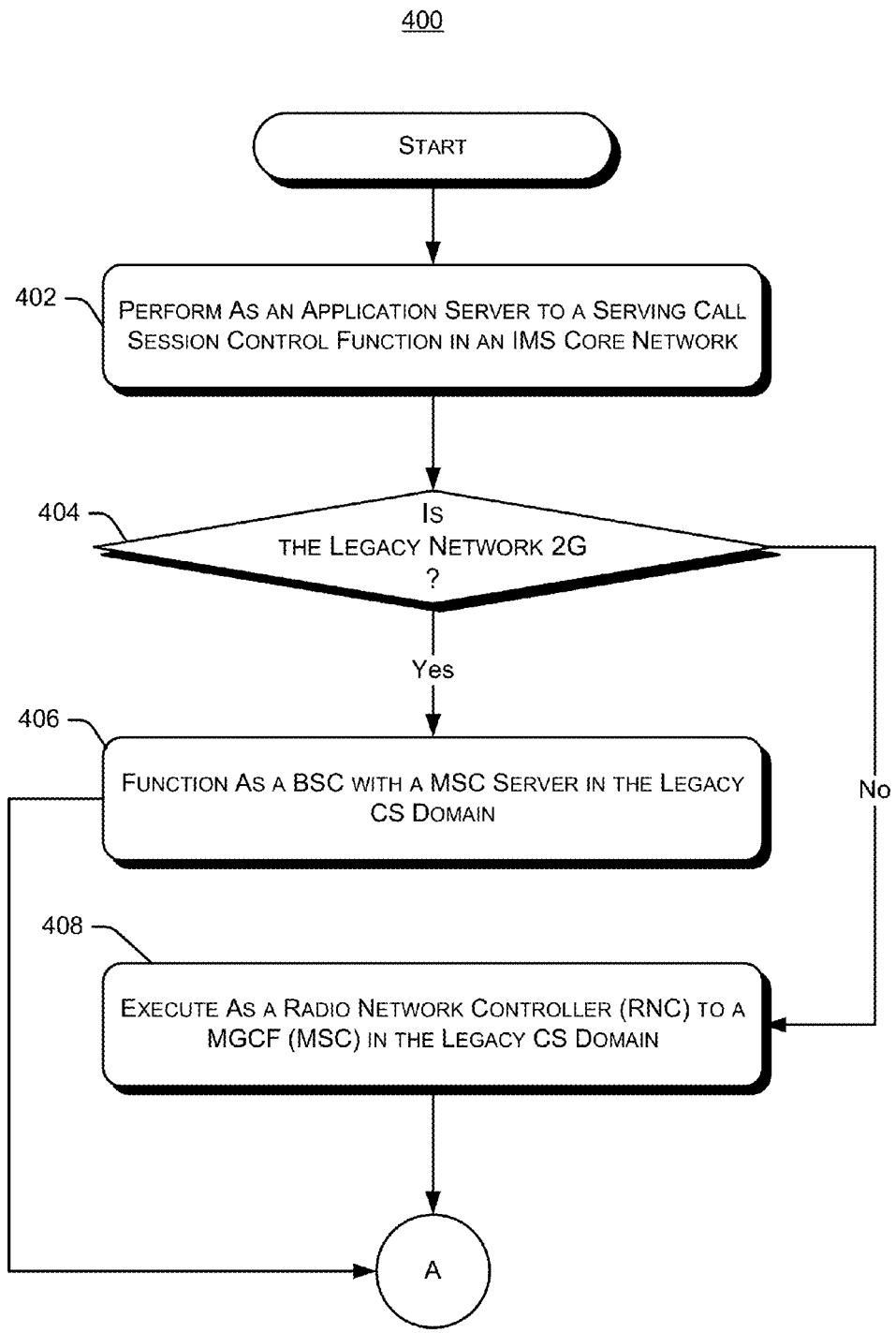
FIG. 4 illustrates another exemplary procedure for service execution across legacy and IMS domains, according to one embodiment.

FIG. 4 shows another exemplary procedure 400 for service execution across legacy and IMS telecommunication network domains, according to one embodiment. The operations of this exemplary procedure 400 are implemented within the system 100 of FIG. 1 and in particular by the convergence gateway 102. At block 402, the convergence gateway performs as an application server to an S-CSCF (106) in an IMS core network (108). Operations of blocks 404 through 408 are directed to configuring the convergence gateway to communicate with appropriate signaling protocols based on whether the legacy telecommunication network 104 (e.g., a 2G or 2.5G network) or a 3G network is used (for purposes of description, all non-IMS networks are hereinafter frequently referred to as legacy networks). More particularly, at block 404, the convergence gateway determines whether it is communicating with a 2G or 2.5G network. If so, operations continue at block 406, where the convergence gateway is configured to function as a Base Station Controller (BSC) to a Media Gateway Control Function (MGCF) portion of a Mobile Switching Center (MSC) server. If at block 404 the convergence server determines that it is not communicating with a legacy 2G network, but rather a 3G network, the convergence gateway is configured to execute as a Radio Network Controller (RNC) to an MGCF (MSC) in the legacy CS domain. At this point, operations of procedure 400 continue in FIG. 5 as indicated by one-page reference "A."

Figure 5:
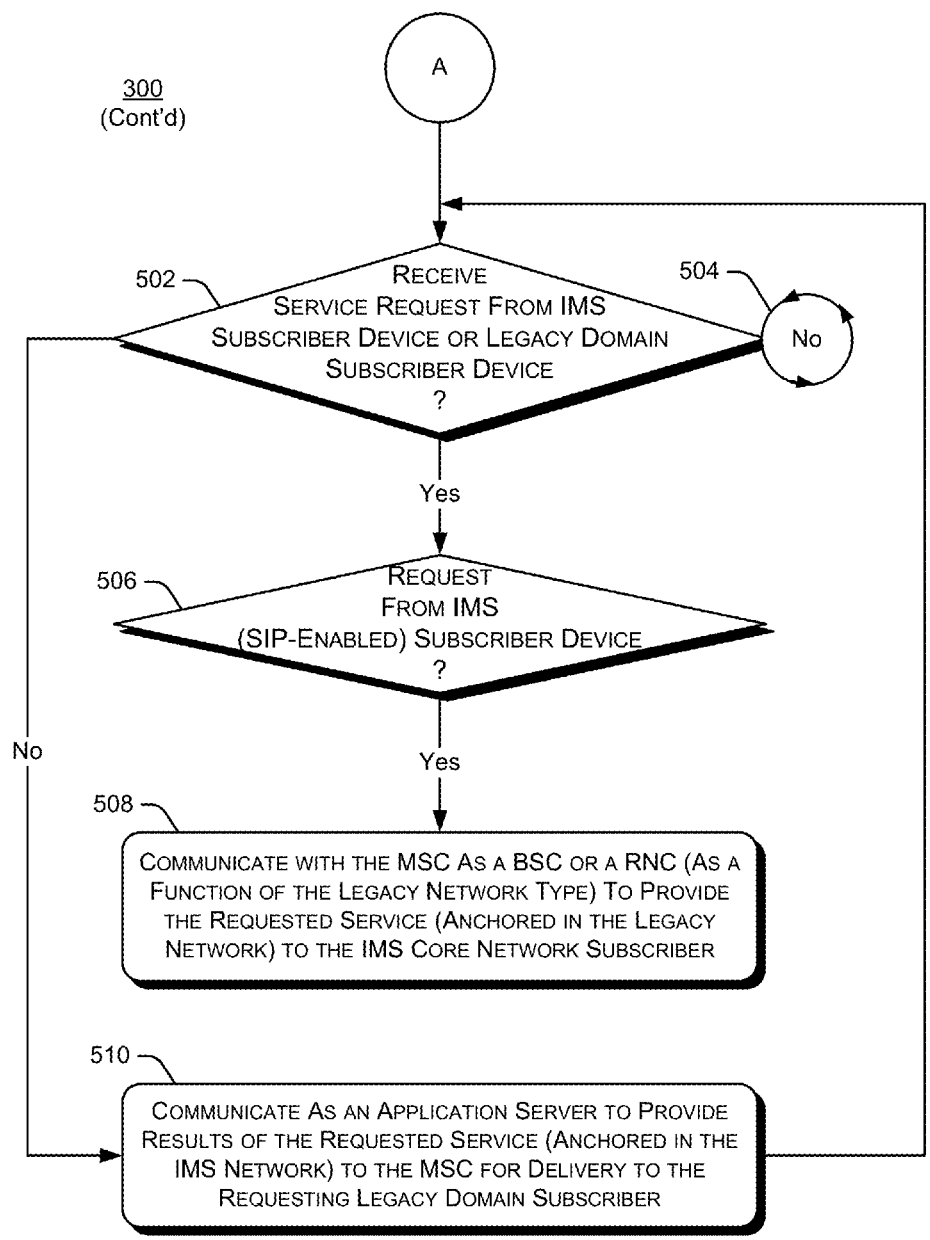
FIG. 5 illustrates further aspects of the exemplary procedure of FIG. 4 for service execution across legacy and IMS domains, according to one embodiment.

FIG. 5 shows further aspects of the exemplary procedure 400 of FIG. 4 for service execution across legacy and IMS telecommunication networks, according to one embodiment. In particular, operations at block 502 determine whether a service request from an IMS subscriber device (114) or a legacy domain subscriber device (via MSC 118) has been received. If not, operations continue at 504, where the convergence gateway (102) continues to poll to determine whether any requests are received on its incoming ports. If operations of block 502 determine that such a service request has been received, operations continue at 506, where the convergence gateway determines whether the service request was from an IMS (SIP-enabled) device (114) for circuit-switched services that is anchored/implemented in the legacy domain (110). If so, operations of procedure 400 continue at block 508, where the convergence server communicates with the MSC (MGCF) 118 using non-SIP signaling protocols to provide the requested service to the requesting IMS core network subscriber.

If operations of block 502 determine the received service request was: (a) from a non-IP-enabled device associated with the subscriber of the legacy domain (110), and (b) for a service anchored in the IMS core network, the convergence gateway (102) communicates as an application server in the IMS domains. This communication is to provide results of the requested IMS-based service to the MSC (104) for delivery to the requesting legacy domain subscriber/device. At this point, operations of procedure 400 continue at block 1002 where the convergence server polls to process any requests for services anchored in the IMS domain (108) or the legacy telecommunication domain (110).

Exemplary Message/Data Flows

Exemplary Registration/Authentication

Figure 6:
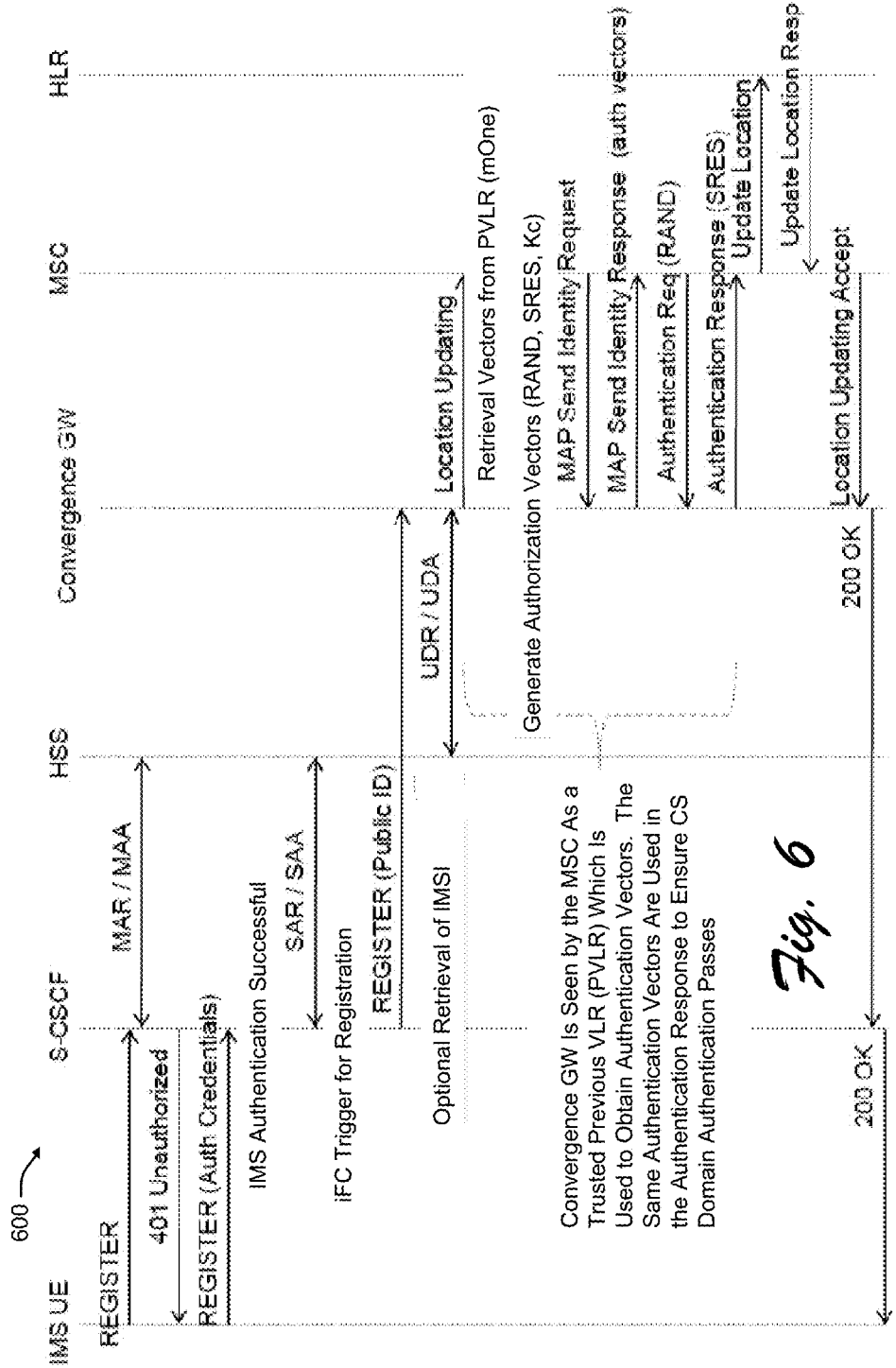
FIG. 6 shows an exemplary message flow for third-party registration with no authentication, according to one embodiment.

FIG. 6 shows an exemplary message flow 600 for third-party registration with no authentication, according to one embodiment. The S-CSCF 110 participates in IMS registration. For all messages initiated by IMS subscribers, the S-CSCF executes the originating Initial Filter Criteria. In this example, VoIP calls (voice services are supported in the legacy domain 104) are routed to the convergence gateway 102, which is also referred to herein as the "converter." The converter forwards these signaling messages to the MGCF (MSC server 118) where the service logic is executed for the originated leg.

Convergence gateway 102 translates the SIP REGISTER message forwarded by S-CSCF 110 to a Mobile Application Part (MAP) location update request, which is sent to the MSC server (MGCF) as defined, for example, in 3GPP TS 29.002. MSC server 118 replies back by sending a location update accept message to the convergence gateway. The convergence gateway translates that message as a success acknowledgment (e.g., SIP 200 OK in response to SIP REGISTER received previously). If the location update is not successful, the convergence gateway 102 replies with an error message as defined, for example, in RFC 3261 section "10.2.8. Error Responses".

One may differentiate two cases to register in the legacy domain (i.e., location updating):

No authentication required by the legacy domain (MGCF) 118. The SIP REGISTER message contains the public ID (IMPU) of the subscriber.
At the reception of the SIP REGISTER from the S-CSCF 110, the convergence gateway 102 fetches the International Mobile Subscriber Identity (IMSI) of the subscriber prior to HSS 114, for example, by sending a Diameter User-Data-Request (UDR) message. The HSS replies by sending a User-Data-Answer (UDA) message.
Following this exchange of information between the MSC server 118 and the convergence gateway 102, the convergence gateway sends a location update request to the MSC server.

Authentication is required by the legacy domain 104 (i.e., the MSC server 118, which is also referred to as the MGCF). To this end:
When the convergence gateway 102 receives a SIP REGISTER message, it fetches the subscriber's IMSI.
As the convergence gateway 102 is considered by the MSC server on 04 (MGCF) as a trusted Previous VLR, the convergence gateway provides authentication vectors to the MSC server and performs an authentication challenge.
Following exchanges associated with the authentication challenge, the convergence gateway 102 sends a location update request to the MSC server 118.

Exemplary Voice Calls

The systems and methods for service execution across legacy and IMS domains simplify media assignment with calls originating from the IMS domains and calls originating from the circuit-switched domain.

Sessions/Calls Initiated in the IMS Domain

Figure 7:
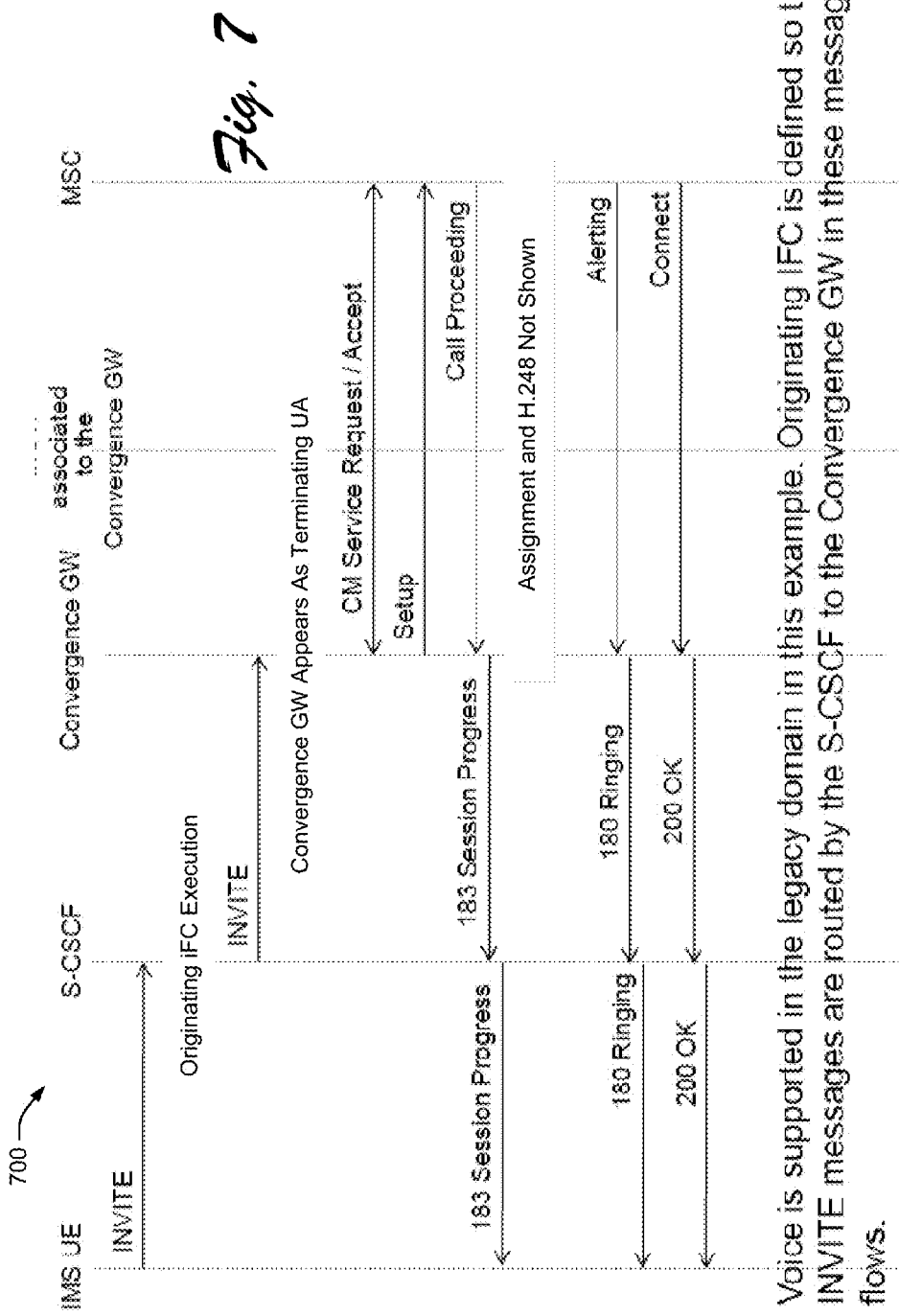
FIG. 7 shows an exemplary message flow for IMS origination of a voice call, wherein the Mobile Switching Center is a terminating application server, according to one embodiment.

FIG. 7 shows an exemplary message flow 700 for IMS origination of the voice call, wherein the MSC 118 is a terminating application server, according to one embodiment. For sessions or calls initiated in the IMS domain, S-CSCF 110 executes the originating Initial Filter Criteria (IFC) and routes associated SIP messages to the convergence gateway 102 for services supported in the legacy domain. For services supported in the IMS domain, SIP messages are routed to application servers (ASs) as defined in 3GPP specifications (mainly 3GPP TS 23.228, 3GPP TS 24.228, and 3GPP TS 24.229).

More particularly, system 100 provides for calls originating in the IMS domain. The calls are routed to the S-CSCF 110 (IMS domain). Calls can be set up in different ways. In one exemplary implementation, the system sets up a call in this context as follows:

An IMS subscriber (User Agent) via an IMS device 106 initiates the call. A corresponding SIP INVITE message is forwarded to the S-CSCF 110 (via the P-CSCF 116). That message is communicated to the convergence gateway 102.

The convergence gateway 102 may respond by sending a "trying" message (e.g., a "100 Trying" message).

The convergence gateway 102 initiates the call with the MSC server (MGCF) 118 by sending a service request message (e.g., a CM Service Request); and the MSC server responds by sending the convergence gateway 102 an acceptance message (e.g., a CM Service Accept).

The convergence gateway 102 sends a Setup message to the MSC server 118.

When the convergence gateway 102 receives a call proceeding message, the convergence gateway 102 translates that message as a session progress (e.g., a "183 Session Progress") and forwards the call proceeding message to the S-CSCF 110. The S-CSCF 110 forwards that message to the User Agent.

At this stage, the convergence gateway 102 initiates the media assignment (e.g., using H.248) with the MGW (shown as respective portion of MSC server 118).

When the convergence gateway 102 receives an "alerting" signal from the MSC server 118, the convergence gateway 102 translates this signal as a ringing indication, for example, as a "180 Ringing" signal. The convergence gateway 102 then sends the signal to the S-CSCF 106 and P-CSCF 116 to forward to the User Agent.

When the convergence gateway 102 receives "Connect" from the MSC server 118, the message is translated, for example, as "200 OK". The translated message is forwarded to User Agent via the S-CSCF 110 and P-CSCF 116.

At this point, the call has been established between IMS and CS subscribers.

Sessions/Calls Initiated in the Legacy Domain

Figure 8:
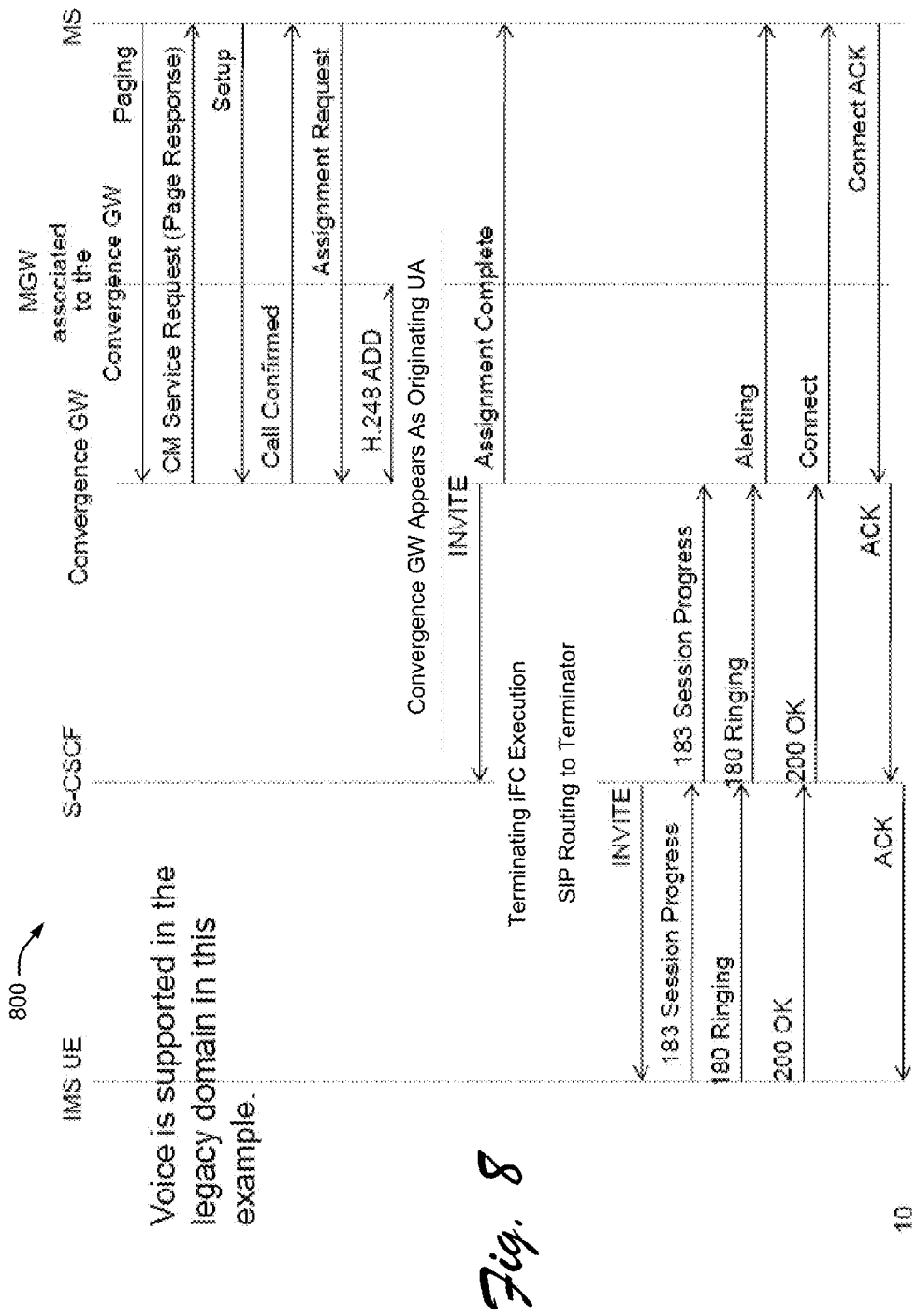
FIG. 8 shows an exemplary message flow for a voice call originating in a legacy telecommunications domain with IMS termination, according to one embodiment.

FIG. 8 shows an exemplary message flow 800 for a voice call originating in a legacy telecommunications domain with IMS termination, according to one embodiment. For calls originating in the legacy domain and destined to IMS subscribers, MSC servers (MGCF) 118 perceive the convergence gateway 102 as a Border Session Controller (BSC). In this scenario, the MSC server 118 queries HLR 120 and routes calls to the convergence gateway 102 to terminate the call. The convergence gateway 102 contacts the S-CSCF 110. A call is forwarded to the S-CSCF 110 (e.g., as defined in 3GPP TS 23.228, 3GPP TS 24.228, and 3GPP TS 24.229), where the terminating IFC is executed. The S-CSCF 110 forwards the call to the P-CSCF 116, which then routes the call to the callee (i.e., the target IMS device 106). This call setup may be implemented in different ways. In one implementation, for example, the call setup is implemented by initiating an SIP session earlier at the reception of the DTAP SETUP message.

For example:

The convergence gateway 102 receives a paging message from the MSC server 118. The convergence gateway 102 responds to the MSC server 118 by sending, for example, a CM Service Request message.

The MSC server 118, responsive to receiving a page response from the convergence gateway 102, sends a SETUP message to the convergence gateway 102; the convergence gateway 102 replies by sending a Call Confirmed message to the MSC server 118.

The MSC server 118 sends an assignment request message to the convergence gateway 102. The convergence gateway 102 sets up the call with the MGW, for example, by sending the H.248 ADD command to the media gateway. The media gateway accepts the command by sending an ADD response message to the convergence gateway 102.

The convergence gateway 102 initiates the call with the S-CSCF 110, for example, by sending an SIP INVITE message. That message is forwarded to the IMS subscriber (User Agent) via the P-CSCF 116.

The User Agent sends session progress and ringing messages to the S-CSCF 110 (via the P-CSCF 116) (e.g., 183 Session Progress and 180 Ringing messages).

Responsive to receiving a ringing message, the convergence gateway 102 translates the message as alerting and forwards it to the MSC server 118.

Responsive to receiving an acknowledgment message (e.g., a "200 OK") from the S-CSCF 110 (the message was originally issued by the User Agent), the convergence gateway 102 translates this message as Connect and forwards it to the MSC server 118.

At this stage, the call is established between a subscriber in the IMS domain 108 and a subscriber in the legacy domain 104.

The call is routed to the visited MSC server 118 serving the convergence gateway 102. That MSC server 118 routes the call to the convergence gateway 102, which routes the call to the S-CSCF 110 as SIP.

Messaging from IMS Subscriber to a Legacy Domain Subscriber

Figure 9:
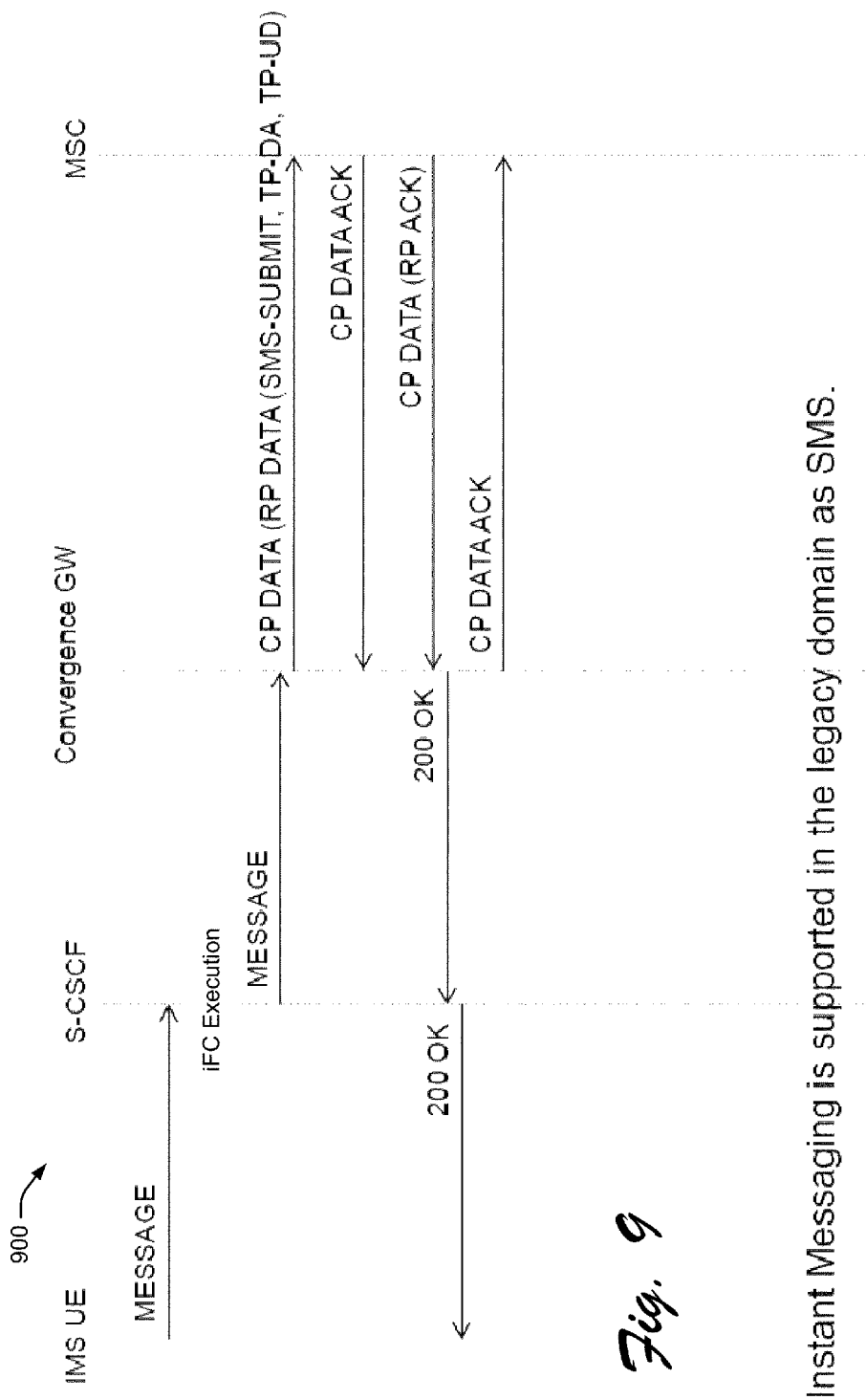
FIG. 9 shows an exemplary message flow to support IP-based Instant Messaging services in a legacy domain as Short Message Service data delivery, according to one embodiment.

FIG. 9 shows an exemplary message flow 900 to support IP-based Instant Messaging (IM) services in a legacy domain as Short Message Service (SMS), according to one embodiment. As illustrated, in FIG. 9, system 100 of FIG. 1 provides for IM communications from an IMS device 106 to SMS data delivery to a legacy domain subscriber. IM provides for real-time text-based communication between two or more participants over IP-based networks. SMS is a Short text Message exchange Service (between mobile phone devices) provided in the GSM mobile communication system. System 100 provides communications between an IM user into the IP-core network 108 and an SMS user in a legacy domain 104 as follows:

Convergence gateway 102 translates SIP MESSAGE messages into SMS as CP DATA message (see SMS data structure) and forces it to the MSC server (MGCF) 118.

As illustrated in FIG. 9, several messages are exchanged between the convergence gateway 102 and the MSC server 118.

The MSC server 118 acknowledges receiving the SMS message by sending CP DATA RP ACK. The Convergence gateway sends the acknowledgment (a "200 OK" message). Another possible response is a "202 OK" message (not shown in FIG. 9) to the S-CSCF 110. The S-CSCF 110 will route that message to the target IMS subscriber (User Agent).

Messaging Sent by the CS Subscriber (SMS) to an IMS Subscriber (IM)

Figure 10:
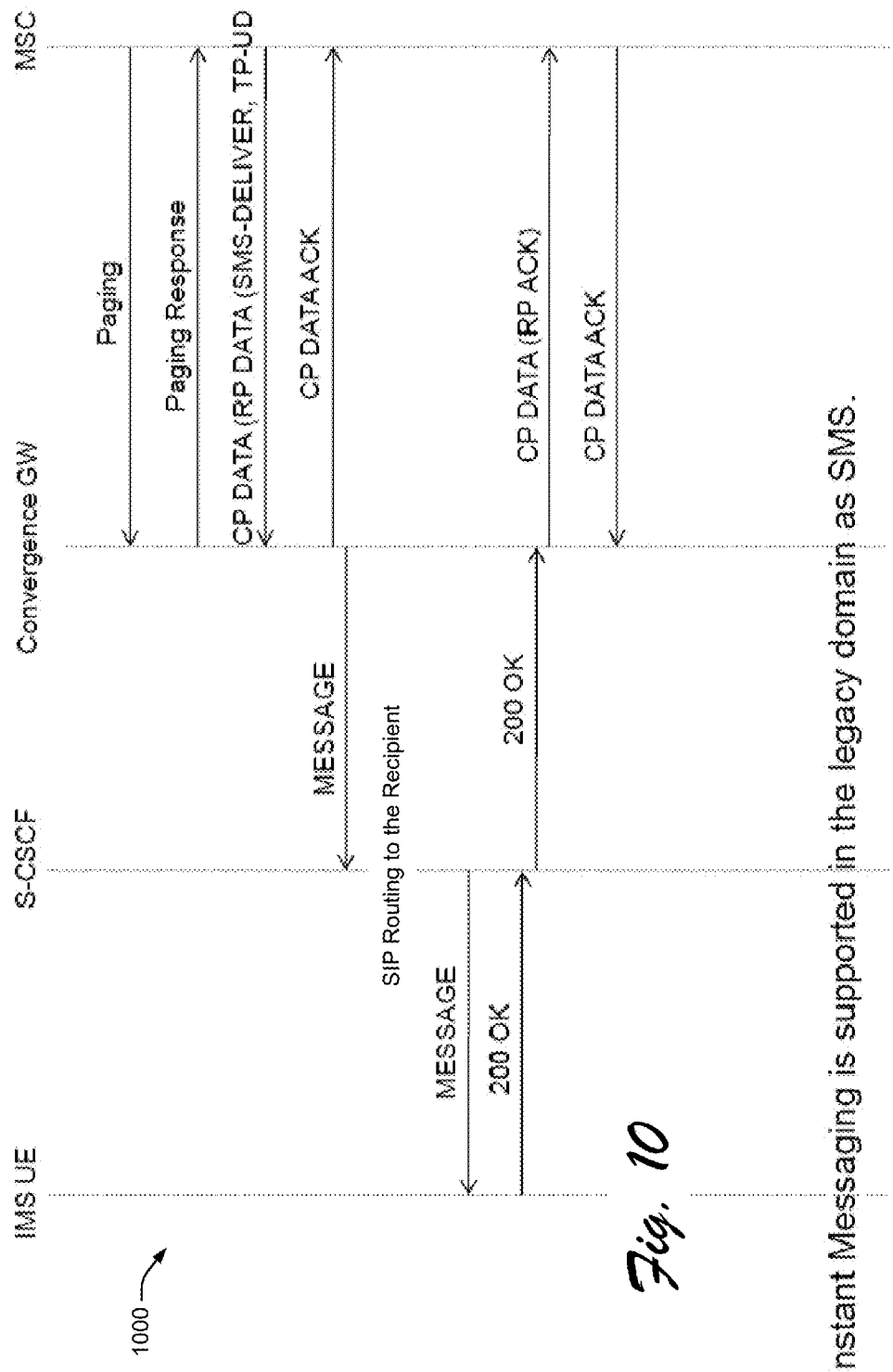
FIG. 10 shows an exemplary message flow for CS-network-based SMS messaging to a SIP-enabled client and an IMS core network (i.e., SMS to IMS terminated IM), according to one embodiment.

FIG. 10 shows an exemplary message flow 1000 for CS-network-based SMS messaging to an SIP-enabled client and an IMS core network (i.e., SMS to IMS terminated IM), according to one embodiment. To provide communications between a subscriber using SMS in a legacy domain 104 and a subscriber utilizing IM in an IMS domain 108, system 100 implements the following operations:

The MSC server 118 performs a paging procedure with the convergence gateway 102.

The MSC server 118 sends the SMS message (as defined on the A interface—see FIG. 1) to the convergence gateway 102. The convergence gateway translates the SMS message (CP DATA message) as SIP MESSAGE message and forwards it to the S-CSCF 110. The S-CSCF 110 will route that message to the IMS subscriber (User Agent).

Provisioning

The S-CSCF 110 uses Initial Filter Criteria (IFC) to involve AS(s) as needed to provide services and features. In this particular implementation, IMS devices associated with IMS subscribers are provisioned in the HSS 114 and the HLR 106. The IFC includes application server 120 and the convergence gateway 102 as an AS. The convergence gateway 102 translates SIP messages into A format and routes them to the MSC server 118.

In one implementation, for example, system 100 provisions HSS 114 for IMS authentication and IMS services (service profile), including IFC, authentication method, and IFC for Instant Messaging and VoIP. In one implementation, the GSM HLR 106 is the primary provisioning system for supporting IWF with IMS. In this implementation, the HLR 106 is provisioned with subscriber identity (e.g., MSDISN), subscription status (active/de-active), and a service profile (e.g., supplementary services, IN services, etc.).

Alternate Embodiments

In one exemplary implementation, convergence gateway 102 (2.1) provides service execution across 3G and IMS domains. In this exemplary scenario, the MSC server 118 (MGCF) considers the convergence gateway 102 to be a Radio Network Controller (RNC) for interface purposes. Analogous to the former implementation, the S-CSCF 110 considers the convergence gateway 102 to be an application server for interface purposes.

Conclusion

Although the systems and methods for service execution across legacy and IMS domains have been described in language specific to structural features and/or methodological operations or actions, it is understood that the implementations defined in the appended claims are not necessarily limited to the specific features or actions described. Rather, the specific features and operations of data encryption and data communication are disclosed as exemplary forms of implementing the claimed subject matter.

The invention claimed is:

1. A method for service execution in/across legacy and Internet Protocol Multimedia Subsystem (IMS) domains, the method comprising:
    utilizing a convergence gateway in an IMS network to interface between the IMS network and a legacy circuit-switched (CS) telephony network; and
    extending legacy network-supported circuit-switched services to IMS subscribers through the convergence gateway, the extending comprising:
        relying on the legacy network to implement supported circuit-switched services and generate corresponding results;
        adapting the corresponding results of the supported circuit-switched services to a signaling protocol and state model for the IMS network;
        providing the adapted results to one or more IMS subscribers;
        performing as an application server (AS) to a Serving Call Session Control Function (S-CSCF) in the IMS network; and
        functioning, if the legacy network is a second generation (2G) network or a twopointfive generation (2.5G) network, as a Base Station Controller (BSC) to a legacy network Media Gateway Control Function (MGCF) portion of a Mobile Switching Center (MSC) server,
    wherein the legacy network-supported circuit-switched services comprise one or more Intelligent Network services, messaging service, voicemail and directory service.

2. The method of claim 1 wherein the legacy network includes analog networks and digital networks.

3. The method of claim 1 wherein extending the legacy network-supported circuit-switched services to IMS core network subscribers further comprises enabling ubiquitous mobile services in the IMS network with legacy circuit-switched supplementary and enhanced voice services delivered to any mobile or IP-based device.

4. The method of claim 1 wherein the extending further comprises:
    performing as an application server (AS) to a Serving Call Session Control Function (S-CSCF) in the IMS network; and
    executing, if the legacy network is a third generation (3G) network, as a Radio Network Controller (RNC) to a Media Gateway Control Function (MGCF) portion of a Mobile Switching Center (MSC) server.

5. The method of claim 1 wherein the legacy network-supported circuit-switched service is an Intelligent Network-based service.

6. The method of claim 1 wherein operations for extending the legacy network-supported circuit-switched services to the IMS network were initiated by an IP-enabled IMS device using Instant Messaging (IM), and wherein the functionality to generate the corresponding results in the legacy CS telephony network is a Short Message Service (SMS).

7. The method of claim 1, and further comprising providing IMS core network services to circuit-switched legacy domains.

8. The method of claim 7 wherein a service of the IMS core network services is a Voice over IP (VoIP) service.

9. The method of claim 1 wherein the legacy network-supported circuit-switched services comprise a voice service including E911 and CALEA regulatory features.

10. A convergence gateway in an Internet Protocol Multimedia Subsystem (IMS) core network for service execution across legacy and IMS domains, the convergence gateway comprising:
    a processor operatively coupled to a memory, the memory comprising computer program instructions executable by the processor, the computer program instructions, when executed by the processor for performing operations, comprising:
        receiving, as an Application Server in the IMS core network, a request for a service from an IMS device;
        in response to the legacy domain being one of a second generation (2G) network or a twopointfive generation (2.5G) network, communicating as a Base Station Controller (BSC) with a Media Gateway Control Function (MGCF) portion of a Mobile Switching Center (MSC) server in a legacy circuit-switched (CS) domain to provide the service to the IMS device, the service being implemented with functionality anchored in the legacy CS domain; and responsive to communicating with the MSC server, providing the service to a subscriber associated with the IMS device,
wherein the service comprises a plurality of services including at least three of:
(a) a voice service,
(b) an Intelligent Network-based service,
(c) a messaging service, wherein the request is associated with Instant Messaging (IM) in an IP-based network, and wherein the functionality is a Short Message Service (SMS),
(d) voicemail, or
(e) a directory service.

11. The convergence gateway of claim 10 wherein the request pertains to a session or call received via Session Initiation Protocol (SIP) signaling.

12. The convergence gateway of claim 10 wherein the operations further comprise:
receiving, while performing as a BSC to the MSC server, non IMS-based signaling from the MSC server for a service anchored in the IMS core network; and
communicating as an application server in the IMS core network to provide the service to the MSC server for delivery to a non-IP subscriber device operatively coupled to the legacy CS domain.

13. The convergence gateway of claim 10 wherein the service comprises:
(a) a voice service,
(b) an Intelligent Network-based service,
(c) a messaging service, wherein the request is associated with Instant Messaging (IM) in an IP-based network, and wherein the functionality is a Short Message Service (SMS),
(d) voicemail, and
(e) a directory service.

14. A telecommunication system for service execution across legacy and Internet Protocol (IP) Multimedia Subsystem (IMS) domains, the telecommunication system comprising:
an IMS core network operatively coupled to Session Initiation Protocol (SIP)-enabled devices, the SIP-enabled devices including subscriber IP-enabled devices;
a legacy telecommunications network operatively coupled to the IMS core network via a convergence gateway in the IMS core network; and
the convergence gateway providing IMS anchored service(s) to subscribers of the legacy telecommunications network and providing legacy service(s) anchored in the legacy telecommunications network to subscribers of the IMS core network by:

(a) performing as an application server (AS) to a Serving Call Session Control Function (S-CSCF) in the IMS core network; and
(b) executing, if the legacy telecommunications network is a third generation (3G) network, as a Radio Network Controller (RNC) to a Media Gateway Control Function (MGCF) portion of a Mobile Switching Center (MSC) server, wherein the service comprises at least two of:
(a) a voice service including E911 and CALEA regulatory features;
(b) a messaging service;
(c) an Intelligent Network service;
(d) a voicemail service; or
(e) a directory service.

15. The telecommunication system of claim 14, wherein, if the legacy telecommunications network is a 2G network, the convergence gateway functions as a Base Station Controller (BSC) to a Media Gateway Control Function (MGCF) portion of a Mobile Switching Center (MSC) server.

16. The telecommunication system of claim 14 wherein a service of the IMS anchored service(s) is a Voice over IP (VoIP) service.

17. The telecommunication system of claim 14 wherein a first service of the IMS anchored service(s) is an IP-based messaging service, and wherein a second service of the legacy service(s) is a Short Message Service (SMS), and wherein an SIP-enabled device initiates an IP-based message session via the first service that is supported by the SMS of the second service.

18. The telecommunication system of claim 14 wherein the convergence gateway comprises:
performing as an AS in the IMS core network;
communicating to a Mobile Switching Center (MSC) server in the legacy telecommunications network to provide a legacy domain-supported service to an SIP-enabled device operatively coupled to the IMS core network; and
adapting signaling protocols from the legacy telecommunications network to the IMS core network.

19. The telecommunication system of claim 14, wherein the service comprises:
(a) a voice service including E911 and CALEA regulatory features;
(b) a messaging service;
(c) an Intelligent Network service;
(d) a voicemail service; and
(e) a directory service.

* * * * *